Patented July 11, 1950

2,515,116

UNITED STATES PATENT OFFICE 2,515,116

FURFURAL CONDENSATION PRODUCTS

James R. Dudley, Cos Cob, Conn., assignor to American Cyanamid Company, New York, N. Y., a corporation of Maine No Drawing. Application October 16, 1946, Serial No. 703,489

15 Claims. (Cl. 210—24)

This invention relates to resins suitable for the removal of anions from liquids, to processes of preparing such anion exchange resins, and to processes of purifying liquids by means of such resins.

It is an object of the present invention to provide a resinous material which is insoluble in water and which is suitable for removing anions from water and other liquid media.

It is a further object of the present invention to provide a process for the preparation of water-insoluble anion active resinous materials.

These and other objects are attained by condensing a biguanide or a guanidine with a reactive carbonyl compound such as an aldehyde having more than one carbon atom or a ketone, and resinifying the resulting condensation product with furfural.

Still another object of the present invention is to provide an improved process for removing anions from, or exchanging anions in, liquids.

This and other objects are attained by contacting a liquid containing anions with a granular water-insoluble anion exchange resin of the present invention.

The invention will be described in greater detail in conjunction with the following specific examples in which the proportions are given in parts by weight unless otherwise indicated. The examples are merely illustrative, and it is not intended that the scope of the invention be limited to the details therein set forth.

EXAMPLE 1

64.5 parts of the condensation product of acetone and guanidine (0.5 mol)
100 parts of water
98.5 parts of 37% hydrochloric acid (1.0 mol)
101 parts of 95% furfural (1.0 mol)

The acetone-guanidine condensation product is suspended in the water, and the hydrochloric acid is added to the suspension. The orange-colored solution which results is cooled to 30° C., and the furfural is added. The solution, which is complete, immediately reddens and darkens very quickly, becoming black within a few minutes.

After standing for about 3½ hours a soft black gel forms which, after 24 hours, is very hard and difficult to break. The material has a dull surface when fractured.

The gel is granulated and cured for 4 hours at 50° C. and 4 hours at 100° C. The cured resin is then ground, screened and evaluated, and the 20–40 mesh product is found to have a capacity for removing anions from solution equivalent to 6.6 kilograins of calcium carbonate per cubic foot of resin and a density of 17.1 lbs./cu. ft.

EXAMPLE 2

64.5 parts of the condensation product of acetone and guanidine (0.5 mol)
110 parts of water
74 parts of 37% hydrochloric acid (0.75 mol)
101 parts of 95% furfural (1.0 mol)

The procedure of Example 1 is followed. A gel forms in about 12 hours and after curing, grinding and screening, the resin is found upon evaluation to have capacity for removing anions from solution equivalent to 9.9 kilograins of calcium carbonate per cubic foot of resin and a density of 25 lbs./cu. ft.

EXAMPLE 3

64.5 parts of the condensation product of acetone and guanidine (0.5 mol)
100 parts of water
71 parts of 37% hydrochloric acid (0.72 mol)
88 parts of 95% furfural (0.875 mol)

The procedure of Example 1 is followed. After gel formation in about 12 hours, the resin is cured, ground and screened, and upon evaluation, the 20–40 mesh material found to have a capacity for the removal of anions from solution of 11.5 kilograins of calcium carbonate per cubic foot of resin and a density of 27.6 lbs./cu. ft.

EXAMPLE 4

64.5 parts of the condensation product of acetone and guanidine (0.5 mol)
95 parts of water
68 parts of 37% hydrochloric acid (0.69 mol)
76 parts of 95% furfural (0.75 mol)

The procedure of Example 1 is followed. Formation of a gel occurs in about 2 days' time. The gel is cured, ground, screened, and then evaluated. It has a capacity fod removing anions from soltuion of 15.4 kilograins as calcium carbonate per cubic foot of resin and a density of 24.6 lbs./cu. ft.

EXAMPLE 5

142 parts of the guanidine carbonate condensation product of crotonaldehyde (1.0 mol)
202 parts of furfural (2.0 mols)
200 parts of water
200 parts of 37% hydrochloric acid (2.0 mols)

The hydrochloric acid is added to a slurry of the guanidine carbonate condensation product in water. After cooling to 30° C. the furfural is added and gelation of the black, homogeneous syrup obtained occurs after it has stood for four days at room temperature. The soft, black gel is broken up into small pieces and cured for 5 hours at 50° C. and for 5 hours at 100° C. The cured product is then ground, screened to 20-40 mesh size, and found to have a capacity for the removal of anions from solution.

*Preparation of the condensation product of acetone and guanidine*

270 parts of guanidine carbonate plus an equivalent of potassium hydroxide (1.5 mols)
348 parts of acetone (6 mols)

A mixture of the ingredients is permitted to stand for three days at 30° C. after which time the potassium carbonate which has formed is filtered off. The reaction mixture is heated for 10 hours at 60° C. and the solution then evaporated.

A 74% yield of a product having a melting point of 169° C. and the following analysis

|  | Per Cent C | Per Cent H | Per Cent N |
|---|---|---|---|
| Calculated for C₇H₁₃N₃ | 60.43 | 9.36 | 30.93 |
| Found | 61.26 | 9.16 | 30.10 |
|  | 61.34 | 9.50 | 30.29 | is obtained.

*Preparation of the guanidine carbonate condensation product of crotonaldehyde*

50 parts of 90% guanidine carbonate (0.25 mol)
35 parts of crotonaldehyde (0.5 mol)
240 parts of methanol The above ingredients are charged into a reaction vessel equipped with a mechanical stirrer and a reflux condenser, and are heated under reflux for about 3 hours. The reaction mixture is filtered and the filtrate obtained evaporated to dryness by means of steam. The residue obtained, while thermoplastic in nature, solidifies to a tan-colored solid upon cooling.

Other ketones may be substituted for the acetone of the preceding examples. Mesityl oxide, monofurfurylidene acetone

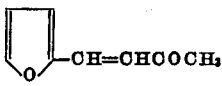

monofurfurylidene methyl ethyl ketone

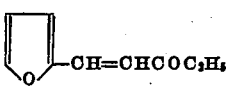

monofurfurylidene methyl isobutyl ketone

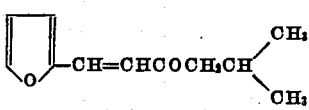

monofurfurylidene acetophenone

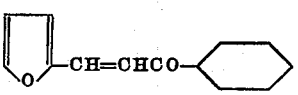

benzalacetone

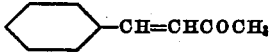

cyclohexanone, cyclopentanone, phorone, Kojic acid

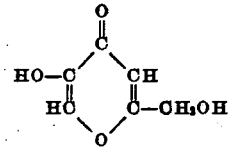

etc. are some examples of these. The ketones contain from 3-13 carbon atoms. Similarly, aldehydes of more than one carbon atom other than the crotonaldehyde of the examples may be condensed with guanidines to form resin intermediates. Examples of these compounds include acetaldehyde, acrolein, furyl acrolein

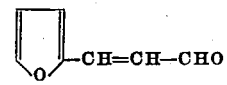

benzaldehyde, p-aminobenzaldehyde, p-dimethylaminobenzaldehyde, heptaldehyde, cuminaldehyde, furfural, etc. The aldehydes contain from 2-10 carbon atoms.

Substituted guanidines may be condensed with a reactive carbonyl compound to produce the resin intermediates just as may guanidine itself. Examples of suitable mono- and di-substituted guanidines are methyl guanidine, N,N- and N,N'-dimethyl guanidines, ethyl guanidine, N,N- and N,N'-diethyl guanidine, N'-methyl-N-ethyl guanidine, phenyl guanidine, N,N-diphenyl guanidine, N,N'-diphenyl guanidine, benzyl guanidine, N,N'- and N,N-dibenzyl guanidines, furfuryl guanidine, N,N'- and N,N-difurfuryl guanidines, butyl guanidine, isobutyl guanidine, tertiary butyl guanidine and the corresponding N,N'- and N,N-dibutyl guanidines, octyl guanidine, N,N-dioctyl- and N,N'-dioctyl guanidines, octadecyl guanidine, N,N-dioctadecyl and N,N'-dioctadecyl guanidines, etc. The corresponding salts such as the carbonates, acetates, etc., of the guanidines, for example, guanidine carbonate, etc., may also be used.

It is believed that the resin intermediates formed by condensation of guanidines with reactive carbonyl compounds are dihydropyrimidines. The reaction between acetone and guanidine, for example, may be represented as follows:

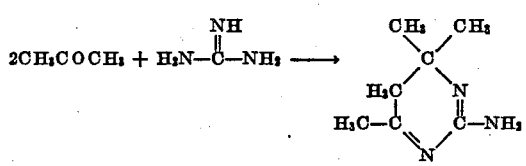

This is just my theory of the mechanism of the reaction, however, and I do not wish to be limited thereto.

In general, guanidines will react with two moles of a ketone such as cyclohexanone and acetone, and with one mol of a ketone such as mesityl oxide.

EXAMPLE 6

141 parts of the condensation product of acetone and biguanide (1.0 mol)
81 parts of formalin (1.0 mol as formaldehyde)
101 parts of furfural (1.0 mol)
200 parts of 37% hydrochloric acid (2.0 mols)
200 parts of water A mixture of the biguanide condensation product, formaldehyde and water is heated to 40° C. to give a clear syrup. The furfural is added to the syrup. The resulting two-layer system is heated to 60° C. and the hydrochloric acid is added thereto.

Upon standing for seven days at about 20° C. the reaction mixture sets to a soft gel which is broken up and cured for 5 hours at 50° C. and for 5 hours at 100° C. The cured product is broken up, screened to 20-40 mesh size and found to have a capacity for the removal of anions from solution of 5.6 kilograins of calcium carbonate per cubic foot of resin.

EXAMPLE 7

68 parts of the condensation product of biguanide and furfural (0.38 mol)
31 parts of 37% formalin (0.38 mol)
95 parts of water
76 parts of 95% furfural (0.76 mol)
112 parts of concentrated hydrochloric acid (1.1 mols)

A mixture of the condensation product, formalin and water is heated to 70° C. by means of steam. A dark colored solution is obtained which is cooled to 30° C. The furfural is added to the cooled solution, followed by addition of the hydrochloric acid. The solution becomes darker and after standing for about 2 days, a soft black lustrous gel forms. The gel becomes harder after standing for an additional day, and it is granulated and cured for 4 hours at 50° C. and 4 hours at 100° C.

The cured black product is ground, screened, and found upon evaluation to have a capacity for removing anions from solution equivalent to 7.1 kilograins of calcium carbonate per cubic foot of resin and a density of 27.5 lbs./cu. ft.

EXAMPLE 8

190 parts of the condensation product of biguanide and benzaldehyde (1.0 mol)
250 parts of water
100 parts of 95% furfural (1.0 mol)
200 parts of 95% furfural (2.0 mols)
80 parts of 37% formalin (1.0 mol)
490 parts of concentrated hydrochloric acid (2.0 mols)

A mixture of the condensation product, water, and 100 parts of the furfural is heated to 90° C. A red-orange precipitate forms which dissolves upon addition of the formalin. The solution is cooled to 25° C. and the remainder of the furfural added. The reaction mixture separates into two layers, but complete solution occurs upon the addition of the hydrochloric acid. In about 2 hours the solution solidifies, the product resembling an amorphous solid rather than a gel. However, after standing for a day, the gel is granulated and cured for 4 hours at 50° C. and 4 hours at 100° C. The cured resin is ground and screened, and the 20-40 mesh material evaluated. The resin has a capacity for the removal of anions from solution equivalent to 3.5 kilograins of calcium carbonate per cubic foot of resin and a density of 18.4 lbs./cu. ft.

Preparation of the condensation product of acetone and biguanide 101 parts of biguanide (1.0 mol)
120 parts of acetone (2.1 mols)
60 parts of methanol The reactants are heated together for about 30 hours at a temperature of 60° C. and the solution is then evaporated. An 85% yield of a product having a melting point of 252°-254° C. and the following analysis

|  | Percent C | Percent H | Percent N |
| --- | --- | --- | --- |
| Calculated for $C_6H_{11}N_5$ | 42.55 | 7.80 | 49.64 |
| Found | 41.41 | 7.56 | 49.23 |
|  | 41.38 | 7.54 | 49.08 | is obtained.

Preparation of the condensation product of biguanide and furfural 89 parts of biguanide (0.88 mol)
107 parts of 95% furfural (1.06 mols)
200 parts of benzene The ingredients are charged into a vessel provided with a thermometer, stirrer, and a trap for collecting water from the condensed vapors. After the mixture has refluxed for 2.75 hours, the theoretical quantity of water has been collected. The precipitate which forms is triturated with acetone and then washed with the same solvent.

A brown colored product is obtained in an 84% yield, and it may be used without further purification as in Example 7.

Preparation of the condensation product of biguanide and benzaldehyde 101 parts of biguanide (1.0 mol)
127 parts of benzaldehyde (1.2 mols)
200 parts of benzene The same procedure is followed as in the preparation of the condensation product of biguanide and furfural described above. About 3 hours refluxing is required before the theoretical amount of water is obtained. A nearly white crystalline powder melting at 176°-181° C. is obtained in an 85% yield. It may be used directly as in Example 8.

Biguanide and derivatives thereof may be reacted with aldehydes having more than one carbon atom other than the benzaldehyde and furfural of the preceding examples. Moreover, other ketones may be substituted for the acetone used in the preparation of the resin intermediates. Any of the ketones and aldehydes listed as suitable for reaction with guanidines may be condensed with biguanides and the condensation products thereafter resinified by means of an aldehyde.

Substituted biguanides may be condensed with any of the foregoing aldehydes or reactive ketones just as biguanide itself may. Examples of some biguanides which are suitable for use in the manufacture of the resins of the present invention are mono- and di-substituted biguanides, for example, phenyl biguanide, N,N'-diphenyl biguanide, N,N-diphenyl biguanide, octadecyl biguanide, N,N- and N,N'-dioctadecyl biguanides, monobenzyl biguanide, N,N- dibenzyl- and N,N'-dibenzyl biguanides, N-ethyl-N'-benzyl biguanide, monofurfuryl biguanide, N,N-difurfuryl- and N,N-difurfuryl biguanides, monoethyl biguanide, N,N-diethyl, and N,N'-diethyl biguanides, butyl biguanide, isobutyl biguanide, tert. butyl biguanide and the corresponding N,N'- and N,N-dibutyl biguanides, octyl biguanide, N,N- and N,N'-dioctyl biguanides, etc. The corresponding salts such as the carbonates, acetates, etc., of the biguanides, for example, phenyl biguanide acetate, etc., may also be used.

While I do not wish to be limited to any particular theory of mechanism of reaction, I believe that biguanides condense with aldehydes having more than one carbon atom and with ketones to form dihydroguanamines. The reaction between benzaldehyde and biguanide might, for example, be represented as follows:

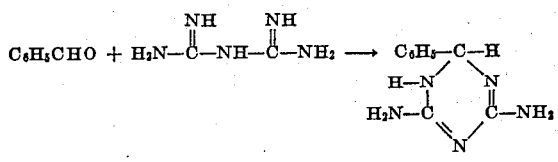

In general, biguanides react with carbonyl compounds including aldehydes having more than one carbon atom and ketones in a 1:1 molar ratio.

A minor portion of the furfural which is used as in Examples 1 through 8 to resinify the condensation products of guanidines or biguanides with reactive carbonyl compounds may be replaced by another aldehyde or by other aldehydes. Examples of some of these are formaldehyde, formaldehyde-yielding substances, acetaldehyde, crotonaldehyde, benzaldehyde, acrolein, etc. Mixtures of one or more different aldehydes may be used. Moreover, part or all of the furfural may be replaced by furfuryl alcohol if desired.

The intermediate condensation products of amidine and reactive carbonyl compound, preferably in a molar ratio of 1:1 to 1:2, are monomeric, relatively simple organic compounds and not complex polymers.

It is desirable that the molar ratio of furfural to guanidine or biguanide condensation product be from 1:1 to 2:1, and I have found that the best resins are obtained when the ratio is about 1.5:1. However, proportions up to as high as 10:1, furfural to condensation product, may be used without departing from the scope of the invention. The use of proportionately less furfural than the preferred amount will in some cases give products having less satisfactory characteristics, while the use of comparatively more furfural appears to offer no particular advantage.

The amount of hydrochloric acid condensing agent which may be used in the preparation of the resins of the present invention is a varying element. From about 1 to 6 mols of hydrochloric acid per mol of condensation product may be used but in most cases, not more than about a 2:1 molar ratio of acid to condensation product is necessary. Other mineral acids such as sulfuric acid, phosphoric acid, etc., may be substituted for the hydrochloric acid of the examples.

The final heat treatment or curing of the resin is preferably carried out at a temperature of 95°–105° C., although other conditions including temperatures ranging from 50° C. up to about 125° C. or higher may be used.

The anion active resins of the present invention may be activated or regenerated by means of dilute alkaline solutions, such as for example, 0.1–25% aqueous solutions of sodium hydroxide, sodium carbonate, etc.

It is preferable to grind and screen the resins to a particle size of from about 8–60 mesh. Use of larger particles causes channeling, and smaller particles of resin have been found to pack, thus reducing the anion exchange efficiency of the material.

The resinous materials produced in accordance with this invention are suitable for the removal of all kinds of acids and anions in general from liquid media. They may be used to extract the strong mineral acids (preferably in relatively low concentrations) and organic acids such as acetic acid, oxalic acid, etc., from water and organic liquids. The anions of salts such as the chloride ion of ammonium chloride and the sulfate ion of ammonium sulfate may be removed by means of the resinous products described herein.

The anion active resins are useful for many purposes examples of which are the removal of acid from water, the removal of acid from alcoholic solutions, the purification of sugar juices, treatment of sugar solutions in general, the purification of pectin, the removal of acid from aqueous formaldehyde solutions, etc. While the resins are especially suitable for the removal of anions from aqueous media, they may be used to extract acids or anions from liquid media other than water. The resins may be used as absorbents for plant nutrients and as such may be used as a media for growing plants or as a means for applying nutrients to the soil.

To be sufficiently insoluble for practical use in the water purification art, resins should have a sufficiently low solubility that they will not be dissolved very rapidly by the solution to be treated. Thus, water should not dissolve more than 1 part of resin in 1000 parts of water when passed through a bed of resin (after the first cycle comprising an activation, exhaustion and reactivation of the resin).

The terms "reactive ketone," "reactive aldehyde," and "reactive carbonyl compound," as used in the present specification and claims, are intended to cover those carbonyl compounds which will react with a guanidine or a biguanide to form a condensation product which may be resinified by further treatment with furfural.

I claim:

1. A water insoluble, granular, anion active synthetic resinous material obtained by a process including the step of bringing about reaction between the ingredients of a mixture comprising furfural and a monomeric heat condensation product of a member of the group consisting of guanidine, mono- and di- monovalent hydrocarbon and furfuryl-substituted guanidines, biguanide, mono- and di- monovalent hydrocarbon and furfuryl- substituted biguanides and their salts with a carbonyl compound selected from the group consisting of aldehydes having from 2–10 carbon atoms and ketones having from 3–13 carbon atoms, the molar proportion of said member to said carbonyl compound being from 1:1 to 1:2, respectively, and said reaction being brought about in the presence of from 1–6 mols of mineral acid per mol of monomeric heat condensation product.

2. A water insoluble, granular, anion active synthetic resinous material obtained by a process including the step of bringing about reaction between furfural and a monomeric heat condensation product of guanidine with a ketone having from 3–13 carbon atoms in a molar ratio of 1:1 to 1:2, said reaction being brought about in the presence of from 1–6 mols of mineral acid per mol of monomeric heat condensation product.

3. A water insoluble, granular, anion active synthetic resinous material obtained by a process of bringing about reaction between furfural and the monomeric heat condensation product of guanidine with acetone in a 1:2 molar ratio, said reaction being brought about in the presence of from 1–6 mols of mineral acid per mol of monomeric heat condensation product.

4. A water insoluble, granular, anion active synthetic resinous material obtained by a process of bringing about reaction between furfural and a monomeric heat condensation product of biguanide with an aldehyde having from 2–10 carbon atoms in a 1:1 molar ratio, said reaction being brought about in the presence of from 1–6 mols of mineral acid per mol of monomeric heat condensation product.

5. A material as in claim 4 wherein the aldehyde is benzaldehyde.

6. A water insoluble, granular, anion active synthetic resinous material obtained by a process of bringing about reaction between furfural and a monomeric heat condensation product of biguanide with a ketone having from 3–13 carbon atoms in a 1:1 molar ratio, said reaction being brought about in the presence of from 1–6 mols of mineral acid per mol of monomeric heat condensation product.

7. A material according to claim 6 in which the ketone is acetone.

8. A water insoluble, granular, anion active synthetic resinous material obtained by a process including the steps of condensing furfural with a heat condensation product of a member of the group consisting of guanidine, mono- and di-monovalent hydrocarbon and furfuryl-substituted guanidines, biguanide, mono- and di-monovalent hydrocarbon and furfuryl-substituted biguanides, and their salts with a carbonyl compound selected from the group consisting of aldehydes having from 2–10 carbon atoms and ketones having from 3–13 carbon atoms, the molar proportion of said member to said carbonyl compound being from 1:1 to 1:2, respectively, and said condensation of furfural being brought about in the presence of from 1–6 mols of mineral acid per mol of monomeric heat condensation product, permitting the resulting condensation product to gel, curing the gel by heating, and granulating the cured gel.

9. A process which comprises bringing about reaction between the ingredients of a mixture comprising furfural and a monomeric heat condensation product of a member of the group consisting of guanidine, mono- and di-monovalent hydrocarbon and furfuryl substituted guanidines, biguanide, mono- and di-monovalent hydrocarbon and furfuryl substituted biguanides and their salts with a carbonyl compound selected from the group consisting of aldehydes having from 2–10 carbon atoms and ketones having from 3–13 carbon atoms, the molar proportion of said member to said carbonyl compound being from 1:1 to 1:2, respectively, in the presence of from 1–6 mols of mineral acid per mol of monomeric heat condensation product whereby a water insoluble, anion active resinous material is produced.

10. A process which comprises condensing furfural with a monomeric heat condensation product of a member of the group consisting of guanidine, mono- and di-monovalent hydrocarbon and furfuryl substituted guanidines, biguanide, mono- and di-monovalent hydrocarbon and furfuryl substituted biguanides and their salts with a carbonyl compound selected from the group consisting of aldehydes having from 2–10 carbon atoms and ketones having from 3–13 carbon atoms, the molar proportion of said member to said carbonyl compound being from 1:1 to 1:2, respectively, in the presence of from 1–6 mols of mineral acid per mol of monomeric heat condensation product, permitting the reulting condensation prouct to gel, curing the gel and heating, and granulating the cured gel.

11. A process of removing anions from liquids which comprises contacting a liquid containing anions with the water-insoluble, granular, resinous material of claim 1, and removing the resinous material from contact with the liquid.

12. A process of removing anions from liquids which comprises passing a liquid containing anions through a bed of the water-insoluble, granular, resinous material of claim 8.

13. A process of removing anions from aqueous solutions which comprises passing an aqueous solution containing anions through a bed of the water-insoluble, granular, resinous material of claim 3.

14. A process of removing anions from aqueous solutions which comprises passing an aqueous solution containing anions through a bed of the water-insoluble, granular, resinous material of claim 5.

15. A process of removing anions from aqueous solutions which comprises passing an aqueous solution containing anions through a bed of the water-insoluble, granular, resinous material of claim 7.

JAMES R. DUDLEY.

REFERENCES CITED

The following references are of record in the file of this patent:

UNITED STATES PATENTS

| Number | Name | Date |
|---|---|---|
| 2,388,235 | Bowman | Nov. 6, 1945 |
| 2,420,419 | Dudley | May 13, 1947 |
| 2,428,329 | Ham et al. | Sept. 30, 1947 |